United States Patent
Krikke et al.

(10) Patent No.: US 10,430,058 B2
(45) Date of Patent: Oct. 1, 2019

(54) USER INTERFACE FOR MEDIA PROCESSING APPARATUS

(71) Applicant: Océ-Technologies B.V., Venlo (NL)

(72) Inventors: Nanne Krikke, Venlo (NL); Josephus A. M. Van Dun, Venlo (NL); Bastiaan J. Hermus, Venlo (NL)

(73) Assignee: OCE-TECHNOLOGIES B.V., Venlo (NL)

(*) Notice: Subject to any disclaimer, the term of this patent is extended or adjusted under 35 U.S.C. 154(b) by 195 days.

(21) Appl. No.: 15/436,395

(22) Filed: Feb. 17, 2017

(65) Prior Publication Data
US 2017/0160917 A1    Jun. 8, 2017

Related U.S. Application Data

(63) Continuation of application No. PCT/EP2015/069024, filed on Aug. 19, 2015.

(30) Foreign Application Priority Data

Aug. 26, 2014    (EP) .................................... 14182334

(51) Int. Cl.
*G06F 3/0484*    (2013.01)
*G06F 3/0485*    (2013.01)
*G06F 3/12*      (2006.01)
*H04N 1/00*      (2006.01)

(52) U.S. Cl.
CPC ........ *G06F 3/04847* (2013.01); *G06F 3/0485* (2013.01); *G06F 3/1203* (2013.01); *G06F 3/126* (2013.01); *G06F 3/1292* (2013.01); *H04N 1/00411* (2013.01); *H04N 1/00424* (2013.01); *H04N 1/00954* (2013.01); *G06F 2203/04806* (2013.01); *H04N 2201/0082* (2013.01)

(58) Field of Classification Search
CPC ... G06F 3/04847; G06F 3/0485; G06F 3/1203
See application file for complete search history.

(56) References Cited

U.S. PATENT DOCUMENTS

| | | | |
|---|---|---|---|
| 2005/0243365 A1 | 11/2005 | Noda | |
| 2009/0006475 A1* | 1/2009 | Udezue | G06F 17/30997 |
| 2011/0112321 A1 | 5/2011 | Hagiya | |
| 2013/0099916 A1* | 4/2013 | Camp | G42B 19/0428 340/501 |
| 2014/0013243 A1 | 1/2014 | Flynn, III et al. | |
| 2015/0054865 A1* | 2/2015 | Landa | G06F 3/1211 347/2 |

OTHER PUBLICATIONS

U.S. Appl. No. 61/611,556, filed Mar. 2012, Landa; Benzion.*
U.S. Appl. No. 61/611,556, Landa; Benzion, filed Mar. 2012 (Year: 2012).*

* cited by examiner

*Primary Examiner* — Li P Sun
(74) *Attorney, Agent, or Firm* — Birch, Stewart, Kolasch & Birch, LLP

(57) ABSTRACT

A user interface for at least one media processing apparatus includes a display device connected to an apparatus control system and arranged to visualize timings of events occurring or expected to occur in a processing sequence of the apparatus, the timings being visualized by showing an indication of each event on a timeline that has a certain time scale and a certain zero point, wherein the timeline has at least two sections which differ in the time scale and/or the zero point.

8 Claims, 2 Drawing Sheets

USER INTERFACE FOR MEDIA PROCESSING APPARATUS

CROSS REFERENCE TO RELATED APPLICATIONS

Figure 1:
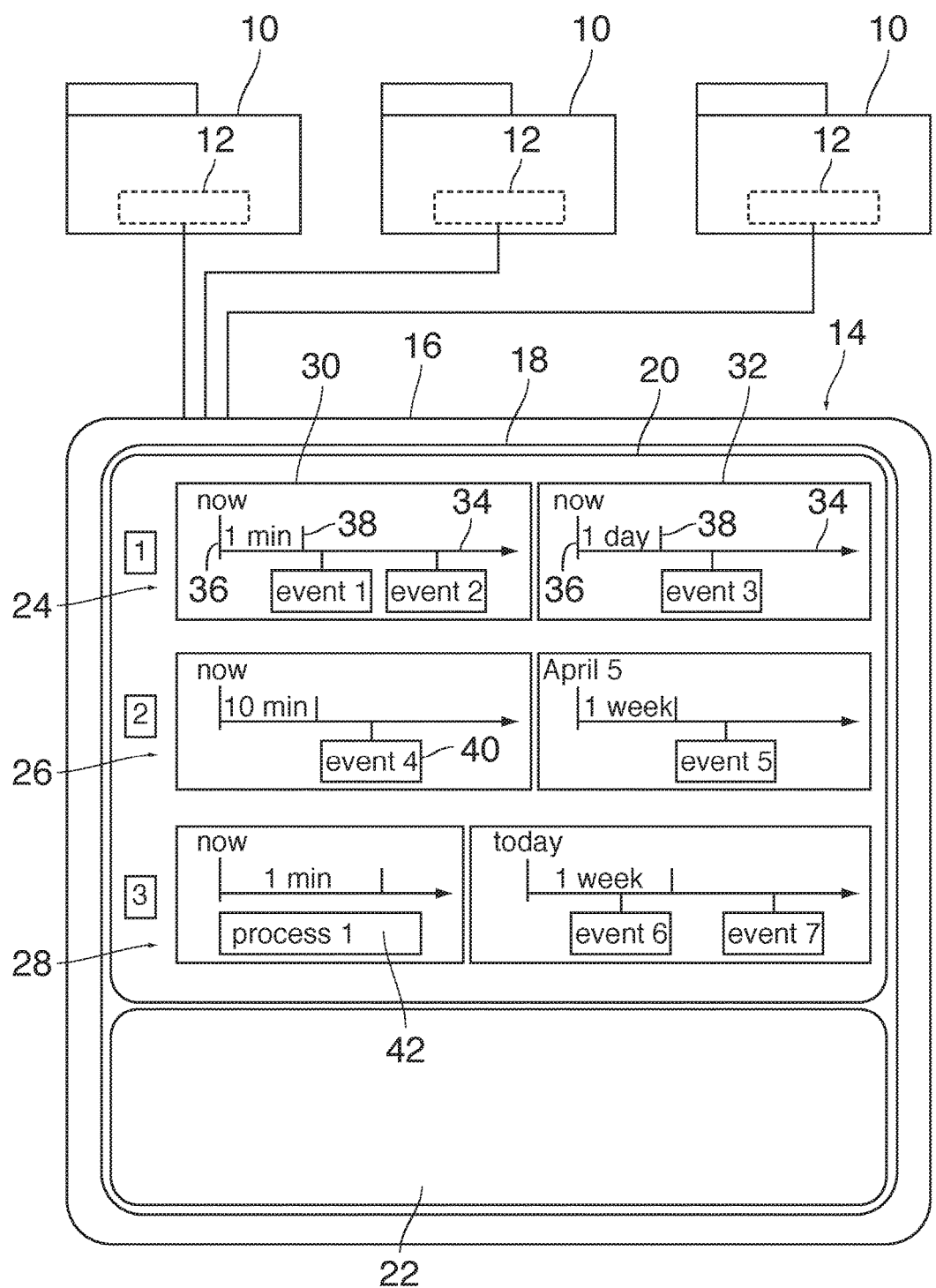

This application is a Continuation of PCT International Application No. PCT/EP2015/069024, filed on Aug. 19, 2015, which claims priority under 35 U.S.C. 119(a) to patent application Ser. No. 14/182,334.4, filed in Europe on Aug. 26, 2014, all of which are hereby expressly incorporated by reference into the present application.

The present invention relates to a user interface for at least one media processing apparatus, the user interface having a display device connected to an apparatus control system and arranged to visualize timings of events occurring or expected to occur in a processing sequence of the apparatus, the timings being visualized by showing an indication of each event on a timeline that has a certain time scale and a certain zero point.

An example of a user interface of this type has been described in US2011112321 A1. The concept of displaying a timeline summary of relevant events has the advantage that a user or operator of the apparatus is informed in a very intuitive way about the status and progress of the processing sequence, about any possible actions that may be required from her or him and about the times when such actions will be due. Typically, a media processing apparatus such as a printer processes a print queue, i.e. a sequence of print jobs, one after the other. The timeline display may then show the job that is currently been processed and the expected remaining time needed for processing this job and also the expected start and end times of other jobs waiting in the print queue, so that each user can easily see when his own job is expected to be ready. Similarly, so-called media requests may be displayed on the timeline when it is necessary to supply a different type of recording media to the printer in order for the printer to process a print job.

Depending upon the processing speed of the printer and the length of the print queue, the timeline to be displayed may cover a time range in the order of magnitude of several minutes to a few hours. When the time range becomes too long and/or the number of events to be shown therein becomes too large, modern displays offer the possibility to zoom in or out in discrete steps and/or to scroll along the timeline. Then, however, depending on the zoom or scroll condition of the display, important events of which the user or operator should be alerted may not be visible on the display.

It is an object of the present invention to provide a user interface that offers enhanced possibilities to display the timings of relevant events.

According to the present invention, this object is achieved by the feature that the timeline has at least two sections which differ in the time scale and/or the zero point.

The user interface according to the present invention is particularly useful in cases where events or required actions are scheduled for a more distant future, i.e. in a time range of several hours of even days or weeks, but it would nevertheless be desirable to alert the user or operator right now in order to enable him to adapt her or his own plans and schedules accordingly. For example, it may be desirable to advise the user that a maintenance shut-down of the printer is scheduled for the day after tomorrow. When the zoom of the timeline would be adjusted to cover such a large range, the timings of the more immediate events, e.g. events relating to the current print jobs, would have to be displayed with such a high density that they could hardly be recognized on the display. On the other hand, when the zoom factor is adjusted to show the current job schedule, the shut-down two days ahead would not fit into the display. In this case, according to the invention, the second section of the time line may be used to display the remote event on a different time scale that is zoomed out sufficiently to show the event and/or has a zero point shifted into the future so as to show the event even in case of a larger zoom factor. Still, the display offers an intuitive information on the timings of all events.

More specific optional features of the invention are indicated in the dependent claims.

Preferably, the two sections of the time line are differentiated into a short-term section for events expected in the more immediate future and a long-term section for events in the later future. Preferably, both sections of the timeline are displayed with time axes extending in parallel to one another, preferably collinear to one another, with the long-term section adjoining the short-term section along the time axis.

Zoom and scroll functions for the different sections may be coupled to one another or may be provided individually for each section of the timeline, so that the zoom factors and scroll positions of the various sections can be adjusted independently of one another, preferably, however, with the limitation that the events shown in the different sections will always be shown in the spatial order that corresponds to their order in time.

For example, the long-range section should never show an event that occurs earlier than another event that is being displayed in the short-term section.

Figure 2:
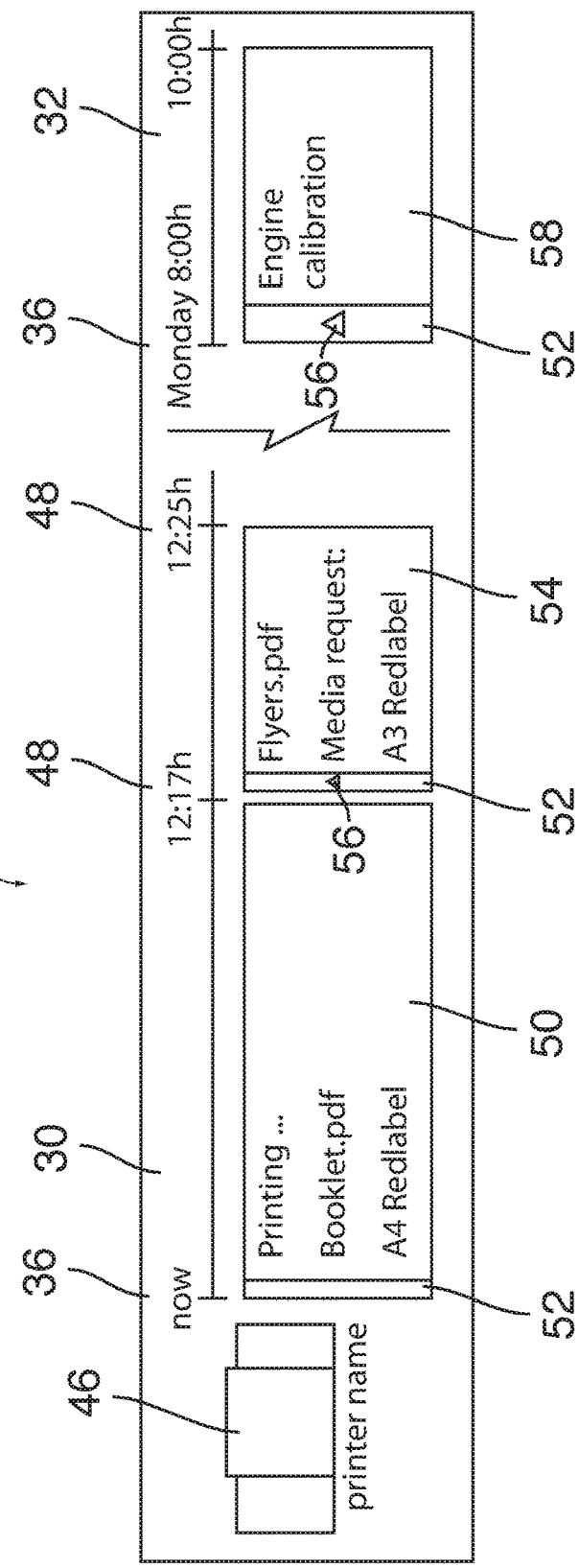

Embodiment examples will now be described in conjunction with the drawings, wherein:

FIG. 1 is a block diagram of a print shop having three printers and a common user interface for the printers; and FIG. 2 illustrates a more detailed example of a display window showing a timeline with two sections.

As an illustrative example, FIG. 1 shows schematically a print shop with three printers 10 having respective control systems 12 that are connected to a common user interface 14.

The user interface 14 has a control panel 16 with a display 18. e.g. in the form of a touch-sensitive screen which, in this example, shows a timeline window 20 and a command window 22. The command window 22 may be used for selecting one of the printers 10 and entering operating commands for that printer, as is generally known in the art and will not be described in detail here.

The timeline window 20 shows three timelines 24, 26, 28, one for each of the three printers 10, the printers being identified by numbers 1, 2 and 3.

Each timeline 24, 26, 28 has a first section 30 (short-term section) and a second section 32 (long-term section). Each section includes a time arrow 34 pointing from left to right.

The starting point of the time arrow 34 marks a zero point 36 of the corresponding section of the timeline. Further, each section 30, 32 has its own time scale 38 symbolized by a certain spatial distance along the time arrow 34 and indicating a length of time, e.g. "1 min", "1 day", "10 min", "1 week", that corresponds to that distance.

Further, each timeline includes a number of indications of events 40, e.g. in the form of a short text description of the event or a symbol or icon, displayed in a position along the time arrow 34 that indicates the time at which the respective event is expected or scheduled to occur.

Each of the timelines may also include a bar-shaped indication of a process 42 (as shown for the timeline 28) that may represent the processing of a print job, for example, the start point and the end point of the bar representing the process 42 being equivalent to events that mark the timings of the start and the end of the process.

The time scales 38 of the two sections 30, 32 of each timeline may be adjusted independently from one another, either in steps or continuously. As an alternative, the time scales may be linked together, so that, when the time scale for the first section 30 is enlarged, for example, the time scale for the second section 32 will be enlarged in proportion The timeline section may be zoomed in or out jointly or individually. Further, the time scale and/or zoom factor for each section may be set automatically depending on the number of events to be shown and on their timings.

Normally, the zero point 36 of each timeline section will be the present ("now"). It is possible, however, that the zero point 36 marks a point of time in the future, as has been exemplified in the second section of the timeline 26, where the zero point is "April 5".

Moreover, the entire window representing the section 30 or 32 of the timeline may be scrolled in forward or rearward direction of the time arrow 34. Preferably, when the window is scrolled, the events move along the time arrow 34, and only the point of time marking the zero point 36 is adapted in accordance with the scroll movement. For example, in the second section 32 of the timeline 26, when the event designated as "event 5" is moved (scrolled) to the left by a distance corresponding to one day, the indication of the zero point would be changed from "April 5" to "April 6".

The scroll and zoom operations may be commanded with finger gestures on the touch screen, as is known for smartphones and tablet computers. Moreover, the division between the windows that are assigned to the first section 30 and the second section 32 may be shifted dependent on the number of events to be shown in each section, as has been illustrated for the timeline 28. The default setting for the border between these windows may be calculated automatically depending on the number of events to be displayed.

Generally, the first section 30 of each timeline is used for showing events that occur in the near future, whereas the second section 32 is used for events in a later future. In order to avoid confusion, it is preferable, however, that the events in both sections of the same timeline are always shown in a spatial sequence that corresponds to the order in which these events occur in time. Thus, for example, a user looking at the timeline 24 can see at a glance that "event 3" occurs later than "event 2", without having to pay attention to the zero points 36 and time scales 38 indicated for the different sections. This imposes certain limits to the scroll function for the second section 32. In particular, the zero point 36 of the second section should not be earlier than the zero point of the first section 30.

Theoretically, when both sections 30 and 32 have the same zero point, one and the same event might be shown in both sections. For example, when the second section 32 of the timeline 24 is zoomed in, so that the time scale is reduced to an hour or several minutes, "event 1" and "event 2" could also be shown in the second section 32. However, it is more convenient to suppress the display of events in the second section 32 when these events are displayed already in the first section 30.

Another attractive option to preserve the sequence of events is to link the scroll movements of the sections together so that the second section will always start where the (displayed part of the) first section ends.

Optionally, in order to cover an even greater range of time, a non-linear, e.g. logarithmic, time scale may be used for the second section 32 and/or uninteresting (eventless) periods of time may be clipped off from the timeline sections.

FIG. 2 shows another example of a timeline 44 for a single printer. The window in which the timeline 44 is displayed shows, on the left margin, a symbolic representation 46 and a name of a printer to which the timeline pertains. The first section 30 starts with the present ("now") as the zero point 36. The time scale has been indicated implicitly by showing time stamps 48 at specific points on the timeline.

A first process in the first section 30 is represented by a bar 50 that reaches from the zero point 36 to the first time stamp "12:17 h" and represents a print job that is just being processed and is expected to be finished at 12:17 h. The bar 50 includes a status information "Printing . . . ", a name "Booklet.pdf" of a document being printed, and a media type "A4 Redlabel" of the media that are being used in this print job.

A coloured (e.g. blue) margin 52 at the left end of the bar 50 indicates that the print job is still being processed and is running. Would the print job be on hold, the colour of the margin 52 would change to red, for example.

The first section 30 further shows another bar 54 that starts at 12:17 h and ends at 12:25 h and indicates the duration of a subsequent print job that is scheduled to start immediately after the present job has been finished. The coloured margin 52 of the bar 54 is displayed in orange, for example, indicating that this process has scheduled but has not jet started. Further, this margin includes an alert sign 56, shaped as a small triangle, indicating that an action is required from the user no later than the time indicated by the corresponding time stamp "12:17 h".

The bar 54 includes the name "Flyers.pdf" of the document to be printed as well as an explanation of the action that is required from the user. In this case, the action is a media request inviting the user to load another media type "A3 Redlabel" into the printer, because this media type will be needed for the print job but is not yet available in the printer. Thus, the user can readily see that he should load the required media type no later than 12:17 h.

The second section 32 of the timeline 44 has "Monday 8:00 h" as the zero point 36 and includes a bar 58 that starts at the zero point and has another alert sign 56 in the (orange) margin 52. A text "Engine calibration" in the bar 58 advises the user that a new calibration of the print engine is scheduled for next Monday, so that the printer will be shut down from 8.00 o'clock on Monday. The bar 58 ends at another time stamp "10:00 h" indicating that the calibration work is expected to be finished at 10.00 o'clock on Monday.

In this example, although the time of the engine calibration is far beyond the scope of the timeline displayed in the first section 30, the user or operator can see in the second section that the printer will be shut down so that she or he can make sure that urgent jobs are printed earlier than Monday, 8:00 h and less urgent jobs are scheduled for a time later than Monday 10:00 h.

It will be understood that the messages shown in the timeline 44 in FIG. 2 are just illustrative examples, and many other messages may be displayed.

For example the messages to be displayed in either section 30 or section 32 of the timeline, depending on their urgency, may comprise a notice that the printer is expected to run out of a certain consumable such as toner, ink, water, staples, media and the like. The time, when the consumer has been used up may be calculated by detecting the still available stock of that consumable and calculating the remaining time from a measured or known average consumption rate.

Another message may just indicate that the stock of a consumable is below a certain level, recommending the user to replete the stock at a certain time. Similar messages may relate to events like a waste bin in the printer being full or almost full.

Other events of which the user may be alerted may comprise preventive maintenance activities the timings of which may be determined on the basis of counters or timers or may be set manually by an operator.

Other events and related messages to be displayed in the timeline, especially in the long-term section 32, relate to planned unavailabilities of the print engine which may be caused by necessary service or maintenance activities, a system update, unavailability of the operator or a pre-reservation of the printer for specific tasks. For example, when it is known that a monthly magazine has to be printed on the firs Monday of every month, the printer may be reserved for this task, and the reservation may be shown on the timeline even when the corresponding print job is not yet available.

The invention claimed is:

1. A user interface for a plurality of media processing apparatuses, comprising:
   a display device connected to an apparatus control system and arranged to visualize timings of events occurring or expected to occur in a processing sequence of each apparatus, the timings being visualized by showing an indication of each event on a plurality of timelines, each timeline having a respective time scale and a respective zero point, and each timeline corresponds to the timings of events occurring or expected to occur in the processing sequence of a respective apparatus among the plurality of the apparatuses,
   wherein a first timeline of the plurality of timelines has at least two sections adjacent one another and in parallel to one another, the at least two sections of the first timeline differ in the time scale and the zero point,
   wherein a second timeline of the plurality of timelines has at least two sections adjacent one another and in parallel to one another, the at least two sections of the second timeline differ in the timescale and have the same zero point,
   wherein each timeline ranges only from the present to the future, and
   wherein each timeline includes an indication of a near future event of said events displayed at a short-term section of the respective at least two adjacent sections and an indication of a later future event of said events at a long-term section of the at least two sections, wherein the later future event occurs or is expected to occur after the near future event and wherein the short-term section has a different timescale than the long-term section, and the long-term section never displays an event that occurs earlier than another event that is being displayed in the short-term section.

2. The user interface according to claim 1, wherein each section each timeline has a time arrow, the time arrows of the sections point in the same direction, and the sections are displayed in positions adjoining to one another in the direction of the time arrows.

3. The user interface according to claim 1, comprising a zoom function for jointly or independently zooming the time scale of each section of the respective timeline.

4. The user interface according to claim 3, wherein the zoom function is a continuous zoom.

5. The user interface according to claim 1, comprising a scroll function for individually scrolling each of the sections of each timeline.

6. The user interface according to claim 1, comprising a scroll function for jointly scrolling the sections of each timeline.

7. The user interface according to claim 1, wherein the display device is arranged to display each event only once in only one of the sections of the respective timeline and to display all the events shown in any of the sections of the respective timeline in a spatial order that corresponds to their order in time.

8. The user interface according to claim 3, wherein the at least two sections differ in time scale before any zooming of the time scale of each section by the zoom function.

\* \* \* \* \*